US010143352B1

(12) United States Patent
Robinson (10) Patent No.: US 10,143,352 B1
(45) Date of Patent: Dec. 4, 2018

(54) ABSORBENT GLOVE

(71) Applicant: Kurt Robinson, Rancho Santa Margarita, CA (US)

(72) Inventor: Kurt Robinson, Rancho Santa Margarita, CA (US)

(*) Notice: Subject to any disclaimer, the term of this patent is extended or adjusted under 35 U.S.C. 154(b) by 308 days.

(21) Appl. No.: 14/686,873

(22) Filed: Apr. 15, 2015

Related U.S. Application Data (60) Provisional application No. 61/980,525, filed on Apr. 16, 2014.

(51) Int. Cl.
*A47L 13/18* (2006.01)
*A41D 19/01* (2006.01)

(52) U.S. Cl.
CPC .............. *A47L 13/18* (2013.01); *A41D 19/01* (2013.01); *Y10S 2/917* (2013.01)

(58) Field of Classification Search
CPC  A47L 13/18; A47L 13/19; A47K 7/02; A47K 7/03; A41D 13/08; A41D 13/081; A41D 13/082; A41D 13/084; A41D 19/01; A41D 19/015; A41D 19/01558; A41D 19/01564; A41D 2600/20; Y10S 2/917
USPC ..... 15/227; 2/917, 158, 159, 160, 161.6, 16, 2/20, 161.8, 167
See application file for complete search history.

(56) References Cited

U.S. PATENT DOCUMENTS

| | | | | |
|---|---|---|---|---|
| 1,231,168 A | * | 6/1917 | Jones ...................... | A47L 13/18 15/227 |
| 2,651,071 A | * | 9/1953 | Dyer ....................... | A47L 13/18 15/227 |
| 4,523,348 A | * | 6/1985 | Petrie ...................... | A47K 7/02 15/227 |
| 4,593,427 A | * | 6/1986 | Ortolivo ................. | A47L 13/19 15/104.94 |
| 4,621,388 A | * | 11/1986 | Ortolivo ................. | A47L 13/19 15/104.94 |
| 5,956,770 A | * | 9/1999 | Dennis .................... | A47L 13/18 15/227 |
| 6,275,995 B1 | * | 8/2001 | Le Gette ................. | A47K 7/02 15/227 |

(Continued)

FOREIGN PATENT DOCUMENTS

| | | | |
|---|---|---|---|
| GB | 1192753 | * | 5/1970 |
| JP | 7-303588 | * | 11/1995 |

*Primary Examiner* — Mark Spisich
(74) *Attorney, Agent, or Firm* — John J. Connors; Connors & Assoc. pc (57) ABSTRACT

A glove comprises a pair of fabric members of the same size and configuration in registration with each other and including opposed ends, with one end narrower than the other end. The fabric members are detachably connected by a two-component connector with one component of the two-component connector being on an inside face of one fabric member and the other component of the two-component connector being on an inside face of the other fabric member. The one fabric member includes a pocket extending along a longitudinal axis of the glove. The pocket is configured to receive a hand of a user and, at the narrower end, includes an entrance for the hand. The pocket comprises a ceiling formed of a first fabric material and a floor of the same first fabric material. The other fabric member has an exterior surface opposite its inner face comprising a cloth material covering an absorbent foam material.

1 Claim, 6 Drawing Sheets

(56) References Cited

U.S. PATENT DOCUMENTS

| | | | |
|---|---|---|---|
| 6,298,488 B1 * | 10/2001 | Duncan | A41D 19/01 2/158 |
| 2008/0034521 A1 * | 2/2008 | Probasco | A47L 1/15 15/143.1 |
| 2008/0301852 A1 * | 12/2008 | Suran | A47L 17/04 2/161.8 |
| 2009/0038098 A1 * | 2/2009 | Chareyron | A61H 7/003 15/227 |
| 2014/0157539 A1 * | 6/2014 | Megerdichian | A47L 13/18 15/227 |

* cited by examiner

ABSORBENT GLOVE

RELATED APPLICATION AND INCORPORATION BY REFERENCE

This utility application claims the benefit under 35 USC 119(e) of U.S. Provisional Patent Application No. 61/980,525, entitled "ABSORBENT GLOVE," filed Apr. 16, 2014. This related application is incorporated herein by reference and made a part of this application. If any conflict arises between the disclosure of the invention in this utility application and that in the related provisional application, the disclosure in this utility application shall govern. Moreover, any and all U.S. patents, U.S. patent applications, and other documents, hard copy or electronic, cited or referred to in this application are incorporated herein by reference and made a part of this application.

DEFINITIONS

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

The word "neoprene" is a family of synthetic rubbers that are produced by polymerization of chloroprene.

The word "trapezoidal" shall mean shaped somewhat like a trapezoid.

BACKGROUND

A problem frequently arises at entertainment and sports events of moisture, particularly sweat, accumulating on the surface of the floor, mat, stage etc. on which the event is conducted. One way to address this problem is using a special mop to wipe up the sweat. My absorbent glove disclosed herein is an improvement over such a specialized mop.

This background discussion is not intended to be an admission of prior art.

SUMMARY

My absorbent glove has one or more of the features depicted in the embodiment discussed in the section entitled "DETAILED DESCRIPTION OF ONE ILLUSTRATIVE EMBODIMENT." These features are not listed in any rank order nor is this list intended to be exhaustive. The claims that follow define my glove, distinguishing it from the prior art; however, without limiting the scope of my glove as expressed by these claims, in general terms, some, but not necessarily all, of its features are:

One, my glove comprises first and second fabric members of the same size and configuration in registration with each other and including opposed ends, with one end narrower than the other end. The fabric members, which may made from Terri-cloth, are detachably connected by a two-component connector. One component of the two-component connector is on an inside face of the first fabric member and the other component of the two-component connector is on an inside face of the second fabric member. The first and second fabric members may be trapezoidal shaped, and may each have edges sown together except at an entrance of the pocket and may be trimmed with a knitted fabric.

Two, the one component of the two-component connector includes a plurality of elements positioned on an exterior surface of the inside face of the first fabric member. The plurality of elements are aligned with at least some of the fingers of a user's hand inserted into the pocket. Four example, the plurality of elements include four elements each aligned with a finger and one element aligned with the palm of the hand.

Three, the first fabric member includes a pocket extending along a longitudinal axis of the glove. The pocket is configured to receive a hand of a user and, at the narrower end, includes an entrance for the hand. The pocket comprises a ceiling formed of a first fabric material and a floor of the same first fabric material. The floor supports a strap positioned within the pocket cross-wise to the longitudinal axis of the glove and beneath which one or more fingers of a user slide upon inserting the hand into the pocket.

Four, the second fabric member has an exterior surface opposite the inner face of the second fabric member comprising a cloth material covering an absorbent foam material. For example, the foam material may comprises layers of anti-bacterial polyester microfibers and Terri-cloth. The first fabric material comprises a neoprene sheet, and the inner surfaces of the neoprene sheet are textured to increase friction.

Five, an advertisement may be displayed on an exterior surface of the first fabric member and is oriented so that an observer can read the advertisement while the glove is being used.

DESCRIPTION OF THE DRAWING

One embodiment of my absorbent glove is discussed in detail in connection with the accompanying drawing, which is for illustrative purposes only. This drawing includes the following figures (Figs.), with like numerals and letters indicating like parts.

DETAILED DESCRIPTION OF ONE ILLUSTRATIVE EMBODIMENT

Figure 1:
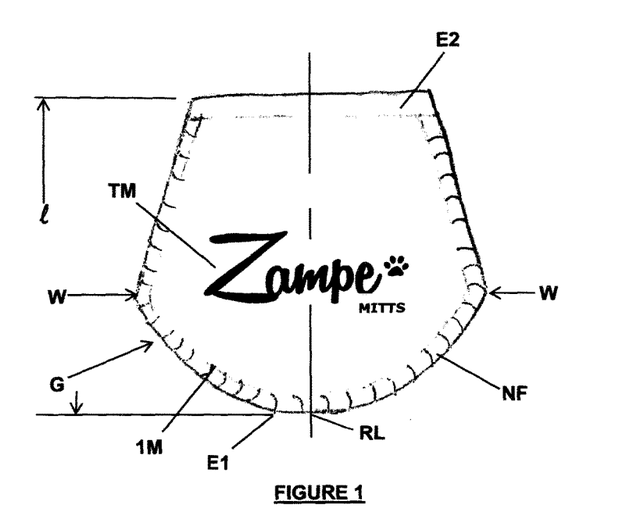
FIG. 1 is a bird's eye view of a user employing one embodiment of my absorbent glove to remove sweat from a horizontal surface.
Figure 2:
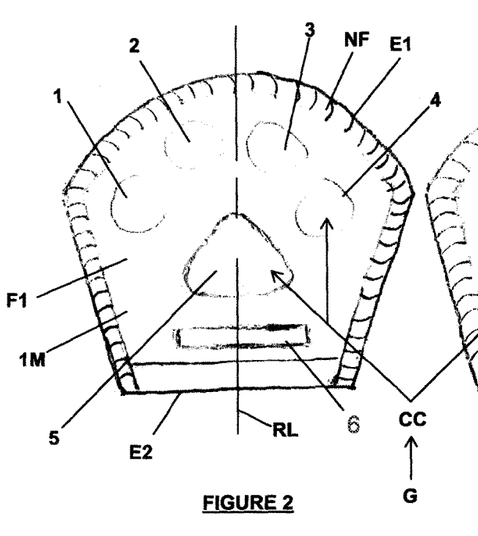
FIG. 2 is a plan view a first fabric member of the embodiment of my absorbent glove shown in FIG. 1 showing an inner face of the first fabric member.
Figure 3:
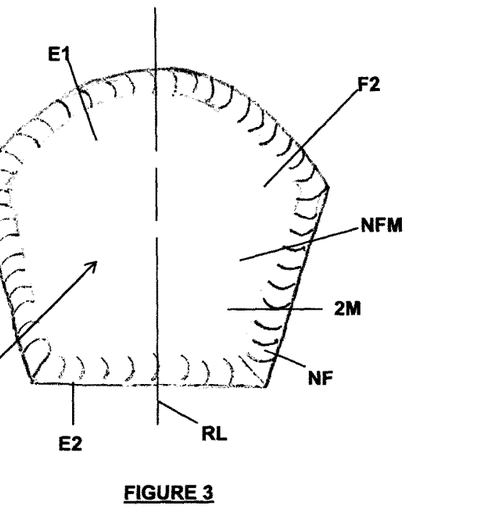
FIG. 3 is a plan view a second fabric member of the embodiment of my absorbent glove shown in FIG. 1.

As illustrated best in FIGS. 1-3, my glove G has a first member 1M and a second fabric member 2M of the same size and configuration in registration with each other along a center longitudinal reference line RL. The members 1M and 2M are detachably connected and used as an assembly, with the first member 1M overlying the second member 2M, which is water absorbent. The user places his/her hand into a pocket P in the first member 1M, and presses the second member 2M downward against a wetted surface. The fabric member 1M, upon being detached from fabric member 1M, is washed and reused.

My glove G may have different configurations, for example, generally square, triangle or circular shaped. Moreover, my clove G may be symmetrical about the reference line RL. In the embodiment illustrated, each member 1M and 2M has opposed ends E1 and E2, with the end E2 being narrower than the end E1, to provide same sized fabric members that are trapezoidal shaped. The pocket P extends lengthwise along the reference RL and is configured to receive a hand of a user. At the narrower end E2, there is an open mouth OM of the pocket P that functions as an entrance for the user's hand.

Figure 6:
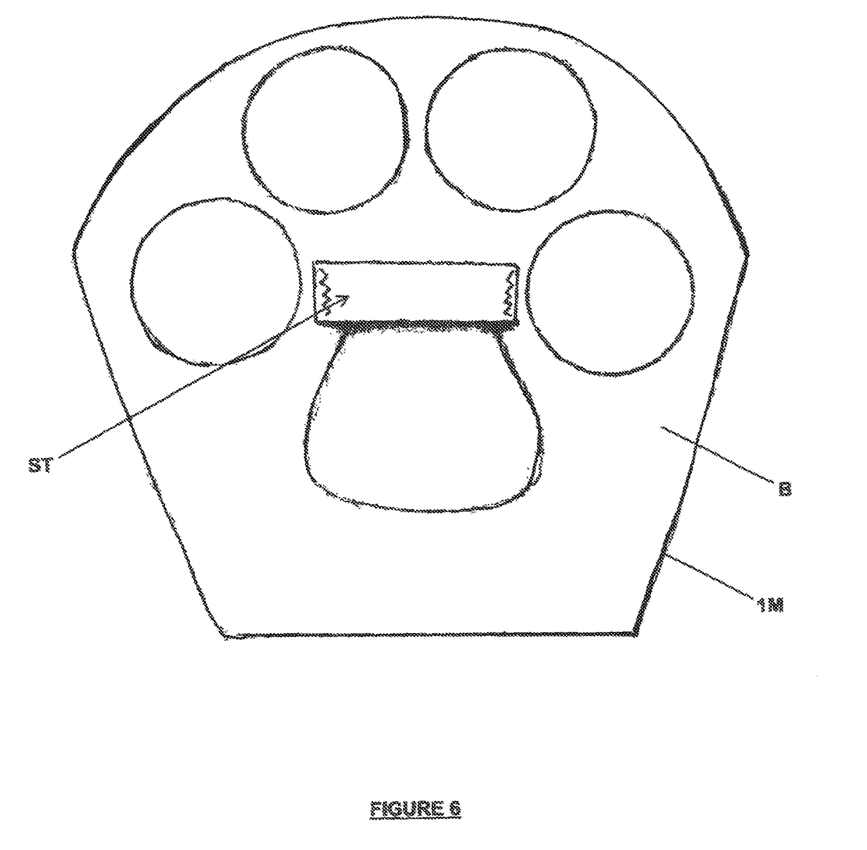
FIG. 6 is a plan view of an inside surface of a floor of the pocket shown in FIG. 5, illustrating a strap used to position the fingers of a user as shown in FIG. 7.
Figure 7:
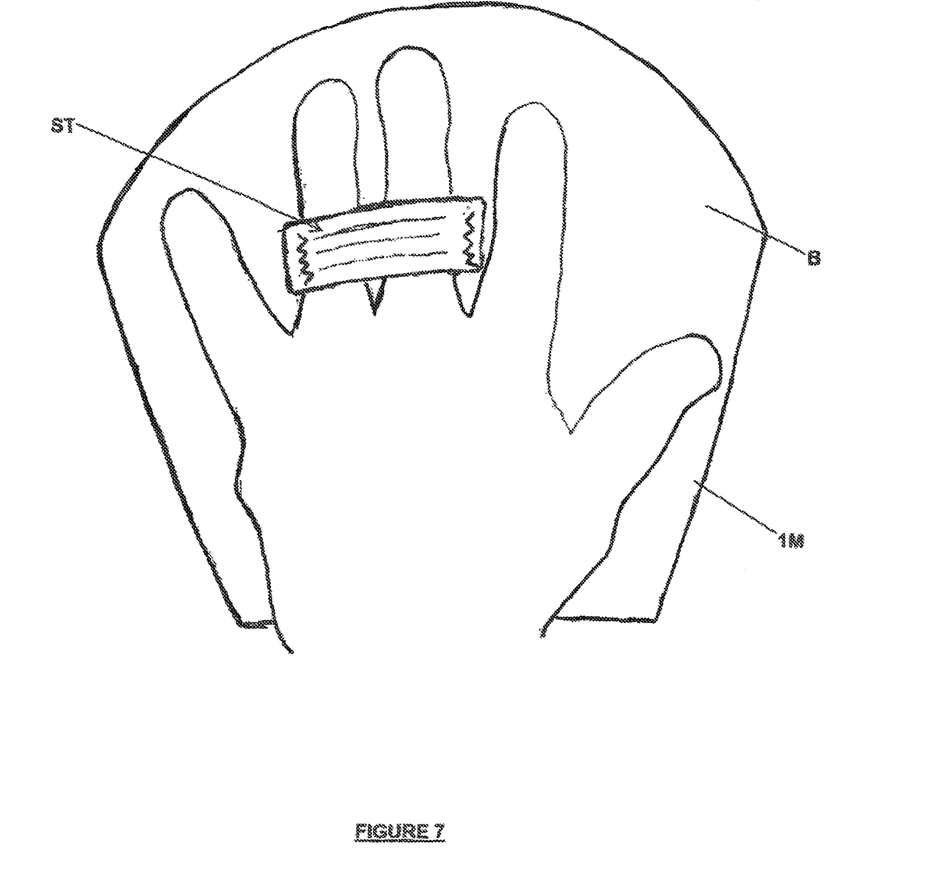
FIG. 7 is a plan view similar to FIG. 6 showing the fingers of a user positioned beneath the strap depicted in FIG. 6.

The fabric members 1M and 2M are detachably connected by a two-component connector CC (FIGS. 2 and 3), for example, Velcro® connectors using hook and fabric components are suitable. The hook component of the two-component connector CC may be on an inside face F1 of the first fabric member 1M as shown in FIG. 2 and the fabric component of the two-component connector may be on the inner face F2 of the second fabric member 2M as shown in FIG. 3. The hook component may include a plurality of elements, for example, hook pads 1-6 positioned on the surface of the inside face F1 of the first fabric member 1M and affixed by sewing. The hook pads 1-4 are aligned with the tips of the four fingers of a user's hand that is to be inserted into the pocket P. The hook pad 5 is aligned with the palm of a user's hand inserted into a pocket P. The hook pad 6 is adjacent the open mouth OM of the pocket P. An elastic strap ST (FIGS. 6 and 7) is sewn to the floor B, centrally positioning the strap on the floor within the pocket P cross-wise at a right angle to the reference line RL. A user upon inserting his/her hand into the pocket P slides one or more fingers beneath the strap ST as illustrated in FIG. 7.

Figure 4:
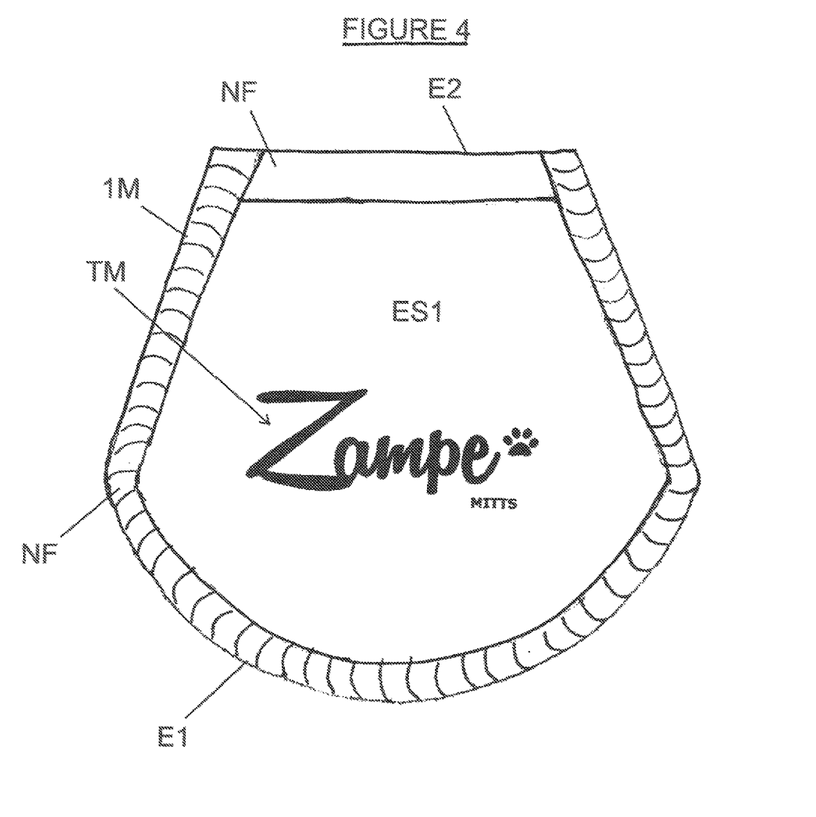
FIG. 4 is a plan view showing an exterior surface of the first fabric member.
Figure 5:
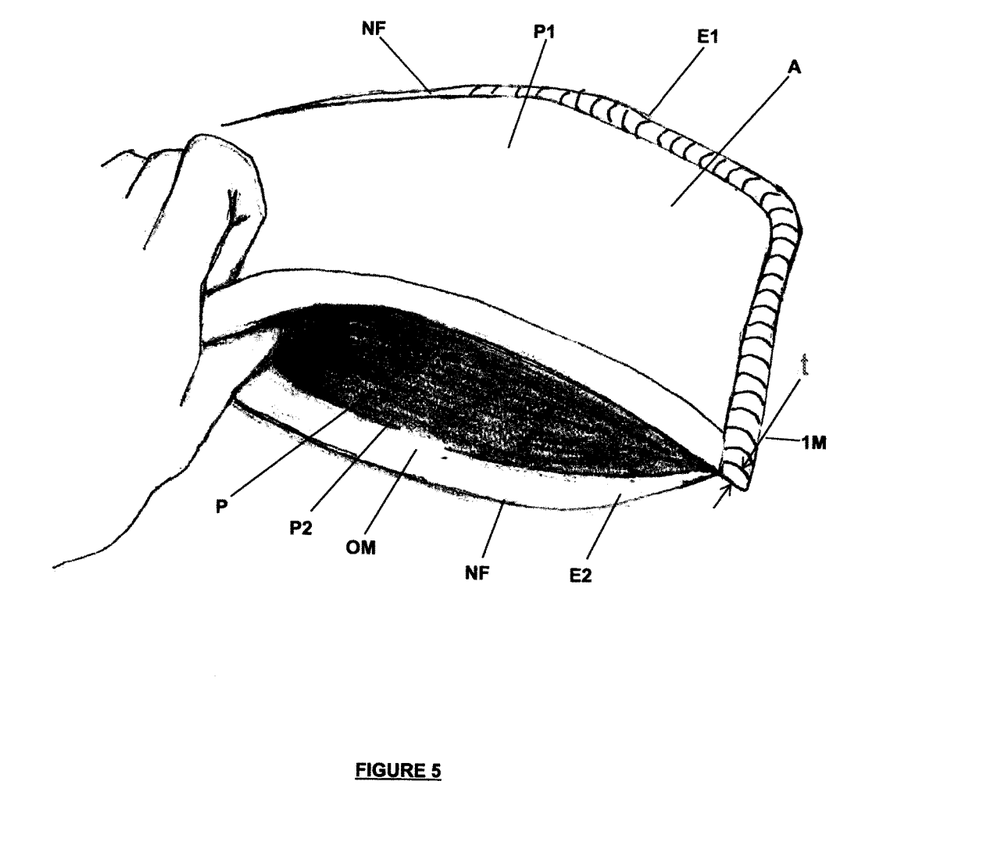
FIG. 5 is a perspective view looking into the interior of a pocket of the first fabric member shown in FIG. 2.

The first fabric member comprises a pair of identical fabric pieces P1 and P2 (FIG. 5) cut from a sheet of neoprene material. The neoprene material is a rubberized fabric that is elastic so it stretches as the user's hand fits within the pocket P and contracts around the hand when in the pocket. The identical fabric pieces P1 and P2 are positioned to overlie each other, and their edges are sown together except at the open mouth OM forming the pocket entrance. These edges are trimmed with a knitted nylon fabric strip NF. The pocket P has a roof A (FIG. 5) comprising the neoprene piece P1 and a floor B (FIG. 5) comprising the neoprene piece P2. The inner surfaces of the pocket P may be textured to increase friction to minimize slippage of the user's hand within the pocket P. As best illustrated in FIGS. 1 and 4, an advertisement such as a trademark ™ may be printed on the exterior surface ES1 of the first fabric member 1M, namely, the exterior surface of the fabric piece P1. As illustrated in FIG. 1, the advertisement is displayed and oriented so that an observer can see and, if written in a language, can read the advertisement while the user wipes up a floor, etc.

Figure 8:
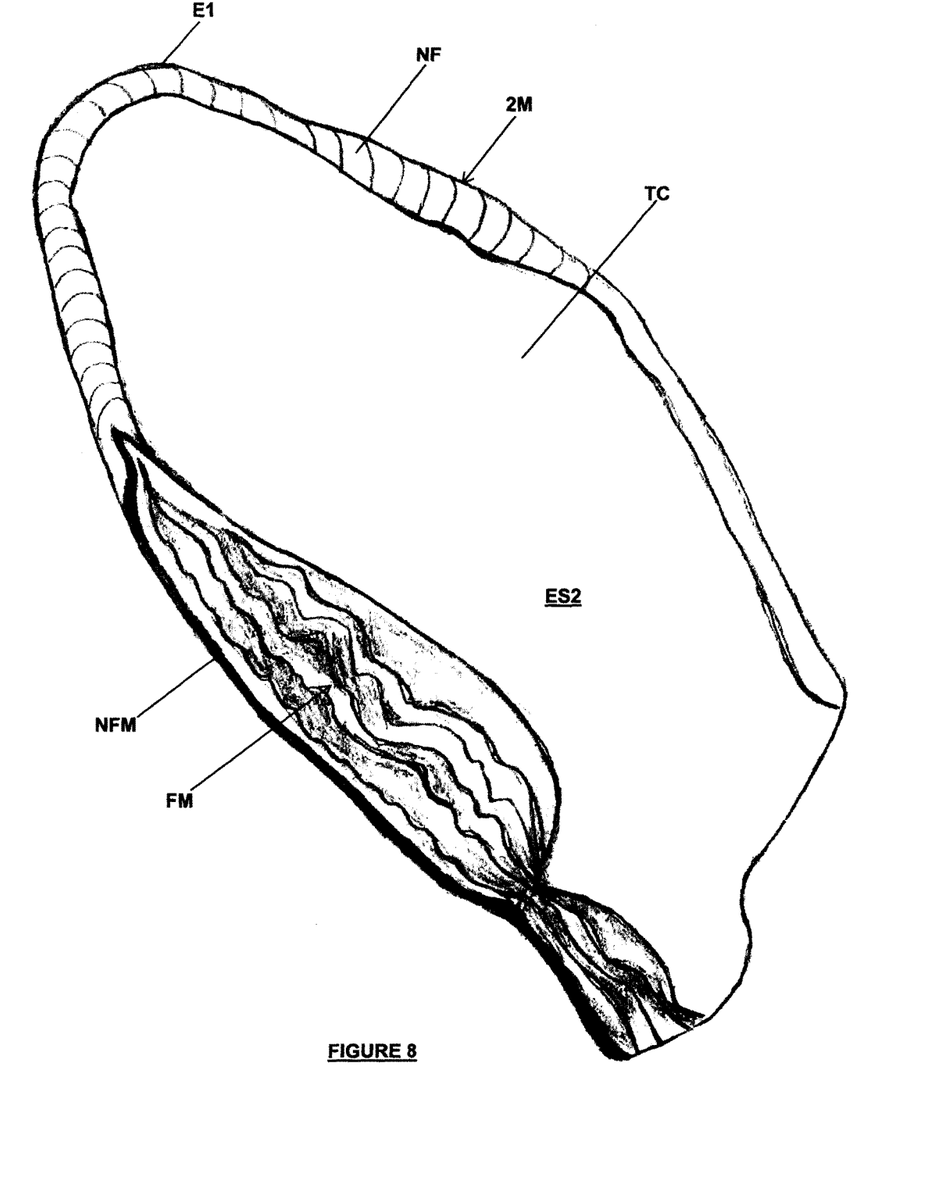
FIG. 8 is a perspective view, with sections broken away, showing multiple foam layers sandwiched between a pair of outer fabric pieces.

The second fabric member 2M comprises a pair of identically sized and configured fabric pieces, the fabric piece NFM (FIG. 3) and the fabric piece TC (FIG. 8). An absorbent foam material FM is sandwiched between these fabric pieces, which may comprises multiple layers of, for example, a natural sponge or synthetic foam or layers of anti-bacterial polyester microfibers and Terri-cloth. The fabric piece NFM is a nylon woven material NFM with its entire inner face F2 functioning as the fabric component of the connector CC that interlocks with the hook pads 1-6 upon assembly as depicted in FIG. 1. The fabric piece TC is an absorbent cotton cloth such as, for example, a sheet of terry cloth TC. As shown in FIG. 8, the second fabric member 2M has an exterior surface ES2 comprising the exterior surface of the sheet of terry cloth TC.

Typically, each fabric member 1M and 2M has a thickness t (FIG. 5) from ¼ to ½ inch measured across the body of the fabric member and not at an edge, a width w (FIG. 1) from 5 to 10 inches, and a length l (FIG. 1) from 7 to 10 inches.

The advantages of my glove G are:
1. It is inexpensive to manufacture.
2. It is mobile.
3. It is lightweight, portable and easy to transport.
4. It is convenient to use.
5. It is washable, the fabric member 2M being detached and washed after using.
6. It is safer because the mitt prevents direct contact with germs and bacteria carried by sweat or other materials being wiped up.
7. In bars and restaurants the mitt will help users with skin irritations from having direct contact with cleaning chemicals and acidity from juices, which may also be a skin irritant.

SCOPE OF THE INVENTION

The above presents a description of the best mode I contemplate of carrying out my absorbent glove and of the manner and process of making and using it, in such full, clear, concise, and exact terms as to enable a person skilled in the art to make and use. My glove is, however, susceptible to modifications and alternate constructions from the illustrative embodiment discussed above which are fully equivalent. Consequently, it is not the intention to limit my glove to the particular embodiment disclosed.

On the contrary, my intention is to cover all modifications and alternate constructions coming within the spirit and scope of my glove as generally expressed by the following claims, which particularly point out and distinctly claim the subject matter of my invention:

1. A mitt having a longitudinal axis, comprising:
   first and second members of the same size and configuration in registration with each other and including opposed ends, the first and second members having a symmetrical configuration about the longitudinal axis, each of the members further having a straight end portion and flaring out to define a portion wider than the straight end portion and an arcuate portion extending from the straight sides and defining a rounded apex centered on the longitudinal axis at the other of the ends;
   said members detachably connected by a two-component connector with one component of the two component connector being on an inside face of the other member, said faces in contact with each other to connect the two components together;
   said first member including a pocket extending along the longitudinal axis of the mitt that is configured to receive a hand of a user and, at the end at the straight end portion of the members, includes an entrance for the hand;
   said second member having an exterior surface opposite the inside face of the second member comprising a cloth material covering an absorbent material; and
   said one component including five elements positioned on an exterior surface of the inside face of the one member, one of said elements aligned with each of the fingers of a user's hand inserted into the pocket and one element aligned with the palm of the user's hand.

\* \* \* \* \*